Patented Sept. 22, 1936

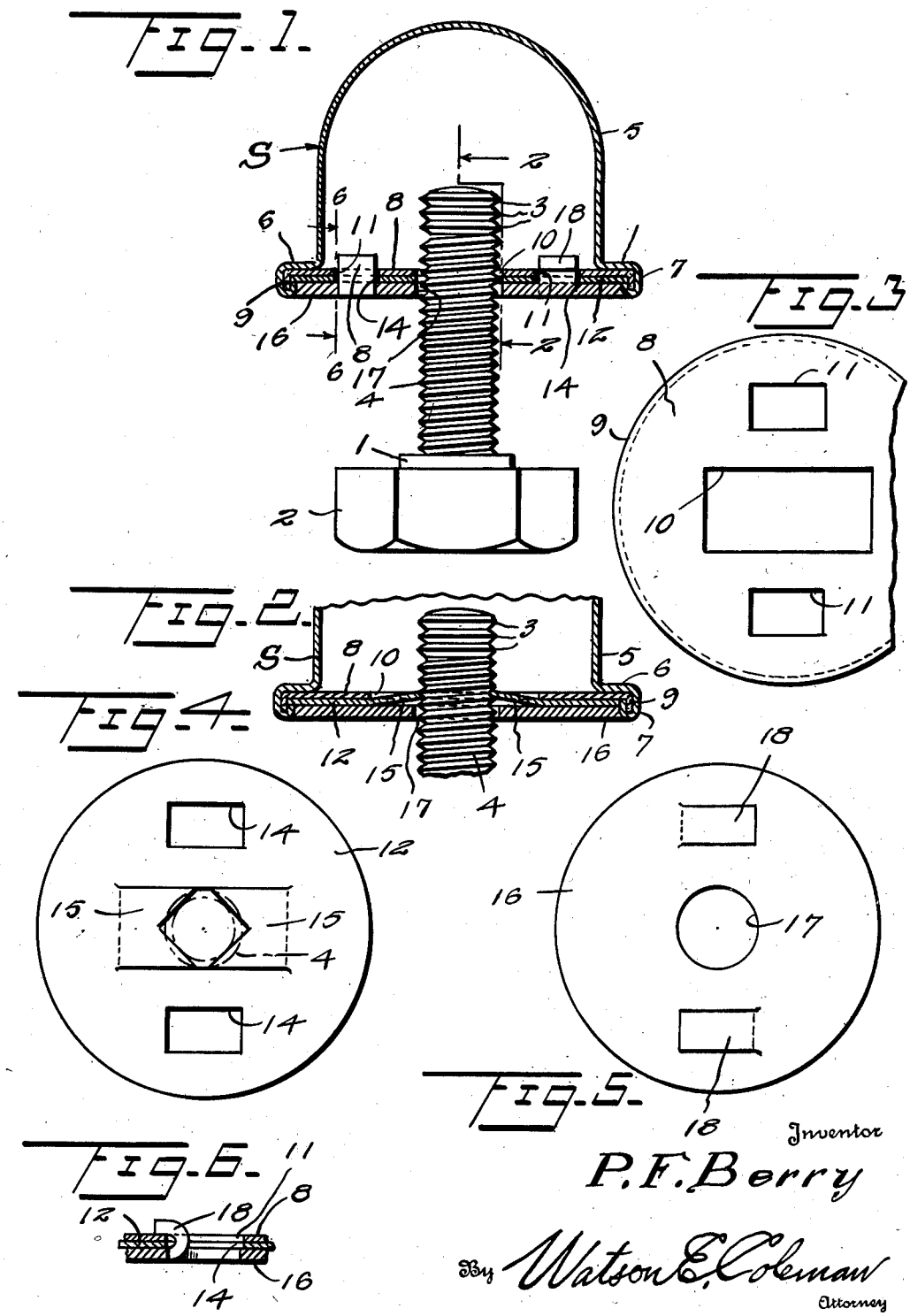

2,055,166

UNITED STATES PATENT OFFICE 2,055,166

BOLT AND SPEED NUT THEREFOR

Paul F. Berry, Columbus, Ohio

Application August 15, 1935, Serial No. 36,421

1 Claim. (Cl. 85—36)

This invention relates to a bolt and speed nut therefor, and it is an object of the invention to provide a bolt and nut of this kind with means whereby the nut can be readily and quickly applied but can only be removed upon destruction.

The invention consists in the details of construction and in the combination and arrangement of the several parts of my improved bolt and speed nut therefor whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view partly in section and partly in elevation illustrating a bolt and speed nut therefor constructed in accordance with an embodiment of my invention;

Figure 2 is a fragmentary sectional view taken substantially on the line 2—2 of Figure 1;

Figure 3 is a fragmentary view in plan of one of the closure plates comprised in the construction of the speed nut;

Figure 4 is a view in plan of the second plate comprised in the structure of the speed nut and which plate carries bolt engaging members;

Figure 5 is a view in plan of the third plate comprised in the structure of the speed nut; and Figure 6 is a fragmentary detailed sectional view taken substantially on the line 6—6 of Figure 1.

As disclosed in the accompanying drawing, my improved bolt comprises a shank 1 provided at one extremity with a head 2. The outer or free end portion of the shank or stem 1 of the bolt is provided with a series of circular or straight pitched threads 3 concentric to the axis of the shank or stem 1. The periphery of the shank or stem 1 inwardly of these threads or grooves 3 is provided with a regular or spiral pitched thread 4 which extends to a point closely adjacent to the head 2.

Coacting with the shank or stem 1 is a speed nut S and as herein disclosed said nut comprises a shell 5 of what might be termed an acorn type having an open face defined by an outstanding flange 6. The periphery of this flange 6 is defined by a second flange 7 at right angles thereto and which initially is straight in cross section.

The flange 7 has seated thereagainst the marginal portion of a plate 8, the periphery of which is defined by a flange 9 extending outwardly from the plate 8 when in working position. The central portion of this plate 8 is provided with an elongated slot 10 through which the shank or stem 1 of the bolt may readily pass, and at opposite sides of this slot 10 are the diametrically opposed smaller slots 11. Overlying the applied plate 8 is a second plate 12 which snugly fits within the field defined by the flange 9 of the plate 8. The flange 9 extends beyond the outer face of the applied plate 12 whereby the outer marginal portion of the flange 7 may be clinched inwardly over the flange 9 of the plate 8 for holding said plate firmly in place and also maintaining the plate 12 in position. This plate 12 is provided with diametrically opposed slots 14 which register with the slots 11 of the plate 8 and struck from the central portion of the plate 12 and between the slots 14 are the inwardly disposed and outwardly inclined fingers or lugs 15. These lugs 15 are directed inwardly of the slot 10 in the plate 8 whereby the speed nut may be readily applied to the stem or shank 1 but the engagement of the fingers or lugs 7 with the threads 4 will effectively hold the speed nut against retracting endwise movement but will so engage the threads 4 to allow the nut S to be threaded along the stem or shank 1.

The circular pitched threads 3, however, provide means whereby the speed nut S is prevented from being threaded entirely off of the shank or stem 1 so that in order to remove the nut it will be necessary that the same be mutilated.

Within the scope of the threads 4 the nut S can be wrenched or otherwise turned to perform its binding function.

Again referring to the nut S, after the plate 12 has been positioned a third plate 16 is positioned thereover, said plate being preferably of a thickness greater than either of the plates 8 or 12 so that added strength will be given to withstand strain imposed upon the fingers or lugs 15. This plate 16 has a central opening 17 through which the free end portion of the stem or shank 1 readily passes. At diametrically opposed points the plate 16 has struck therefrom fingers 18 which are adapted to be forced through the registering openings 11 and 14 and clinched over the inner face of the applied plate 8 whereby all three of the plates 8, 12 and 16 are effectively connected and in a manner to assure maximum strength.

The plate 16 constitutes what can be termed a clinching and locking plate. This plate clinches and locks the shell 5 and the plates 8 and 12 in desired assembled relation and this plate 16 also prevents the lugs or engaging members 15 of the plate 12 springing outward and protects the same against tamper to release the bolt. It is to be further noted that the opening 17 in the plate 16 snugly receives the shank or stem 1 of the bolt thereby permitting the plate 16 to have such binding strength to necessitate the destruction of the nut to effect its removal.

From the foregoing description it is thought to be obvious that a bolt and speed nut therefor constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A fastening device comprising two members, one member including a threaded shank and the other constituting a nut, said nut having a shell provided with an open face, said open face being defined by an outstanding flange, a pair of overlying plates disposed across the open face of the shell and lapping the defining flange, the outer marginal portion of the flange of the shell having means coacting with the plates for holding the plates in position, the innermost plate in its central part having inwardly disposed lugs struck therefrom and between which the shank is insertable, the free ends of the lugs engaging the threads of the shank to permit relative threading adjustment of the shank and nut, the inserted portion of the shank being composed of two threaded portions, one permitting adjustment of the nut and bolt, the other having coaction with the lugs to prevent complete separation of the shank and nut after the shank has been inserted within the nut, the inner plate having a central slot to receive the lugs and of a size to permit the lugs to have required inward movement as the shank enters the nut, both of the plates at opposite sides of the lugs and slot having registering openings, and a reinforcing plate overlying the plate provided with the lugs and positioned at the side of such plate remote from the plate having the slot, said reinforcing plate carrying members insertible through the registering openings of the first plates to provide means for holding the last named plate in position, said reinforcing plate in its central portion having an opening through which the shank is freely insertable as the shank enters the shell.

PAUL F. BERRY.